(12) United States Patent
Barnett

(10) Patent No.: US 9,810,076 B2
(45) Date of Patent: Nov. 7, 2017

(54) FAN HUB DESIGN

(71) Applicant: Pratt & Whitney Canada Corp., Longueuil (CA)

(72) Inventor: Barry Barnett, Mississauga (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 0 days.

(21) Appl. No.: 14/921,264

(22) Filed: Oct. 23, 2015

(65) Prior Publication Data

US 2016/0040540 A1 Feb. 11, 2016

Related U.S. Application Data

(63) Continuation of application No. 13/297,300, filed on Nov. 16, 2011, now Pat. No. 9,169,730.

(51) Int. Cl.
*F01D 5/30* (2006.01)
*F01D 5/14* (2006.01)
*F02K 3/06* (2006.01)
*F01D 5/02* (2006.01)

(52) U.S. Cl.
CPC ............... *F01D 5/30* (2013.01); *F01D 5/02* (2013.01); *F01D 5/14* (2013.01); *F02K 3/06* (2013.01); *F05D 2220/32* (2013.01); *F05D 2240/20* (2013.01); *F05D 2260/941* (2013.01)

(58) Field of Classification Search
CPC ..... F01D 5/00; F01D 5/02; F01D 5/14; F01D 5/147; F01D 5/30; F01D 5/34; F01D 25/04; F01D 25/06; F02K 3/06
See application file for complete search history.

(56) References Cited

U.S. PATENT DOCUMENTS

| | | | |
|---|---|---|---|
| 2,445,661 A | 7/1948 | Constant et al. | |
| 2,928,649 A | 3/1960 | Lombard et al. | |
| 3,323,710 A | 6/1967 | Daly | |
| 3,428,244 A | 2/1969 | Palmer | |
| 3,869,258 A | 3/1975 | Scott | |
| 4,313,712 A * | 2/1982 | Briggs | F01D 21/045 416/170 R |
| 4,934,904 A | 6/1990 | Kennedy | |
| 5,108,261 A | 4/1992 | Ress, Jr. et al. | |
| 5,281,096 A | 1/1994 | Harris et al. | |

(Continued)

FOREIGN PATENT DOCUMENTS

EP 1209320 5/2002

OTHER PUBLICATIONS

EP Search Report issued in EP Publication No. 12192430 dated Nov. 8, 2016.

*Primary Examiner* — Gregory Anderson
*Assistant Examiner* — Danielle M Christensen
(74) *Attorney, Agent, or Firm* — Norton Rose Fulbright Canada LLP

(57) ABSTRACT

A fan rotor for a gas turbine engine has a fan hub mounted for rotation about a central axis of the engine. A plurality of fan blades are circumferentially distributed about a radially outer surface of an outer rim section of the fan hub. The outer rim section is connected to an inner rim section through an axially facing web section. The web section extends from the outer rim section at a location axially aft of the center of gravity of the fan blades. A ridge formation extends radially inwardly from the outer rim axially forward of the web section.

4 Claims, 2 Drawing Sheets

(56) References Cited

U.S. PATENT DOCUMENTS

| | | | |
|---|---|---|---|
| 5,370,501 A * | 12/1994 | Udall | F01D 5/30 |
| | | | 416/216 |
| 6,019,580 A | 2/2000 | Barr et al. | |
| 6,077,035 A | 6/2000 | Walters et al. | |
| 6,354,780 B1 | 3/2002 | Davis et al. | |
| 6,390,775 B1 | 5/2002 | Paz | |
| 6,447,252 B1 | 9/2002 | Barker et al. | |
| 6,511,294 B1 | 1/2003 | Mielke et al. | |
| 6,893,222 B2 | 5/2005 | Allam | |
| 7,153,102 B2 | 12/2006 | Stone | |
| RE39,630 E | 5/2007 | Stangeland et al. | |
| 7,476,080 B2 | 1/2009 | Sato et al. | |
| 2003/0223873 A1 * | 12/2003 | Carrier | F01D 5/3061 |
| | | | 416/213 R |
| 2005/0186080 A1 | 8/2005 | Chivers et al. | |
| 2005/0254952 A1 | 11/2005 | Stone | |
| 2007/0020101 A1 * | 1/2007 | Balamucki | F01D 5/10 |
| | | | 416/219 R |
| 2012/0148401 A1 | 6/2012 | Kulathu et al. | |

* cited by examiner

FAN HUB DESIGN

CROSS-REFERENCE TO RELATED APPLICATIONS

The present application is a continuation of U.S. patent application Ser. No. 13/297,300, the content of which is incorporated herein by reference.

TECHNICAL FIELD

The present application relates to gas turbine engines and, more particularly, to a fan hub design.

BACKGROUND ART

Fan hub designs are routinely optimized to meet various criterias. Such criterias include uniform radial hub displacement, hub fatigue stress, tooling access for machining, oil drainage, air foil fillet stress, burst speed and weight minimization.

SUMMARY

According to one aspect, there is provided a fan blade hub for a gas turbine engine compressor. The fan blade hub has a plurality of fan blades secured in spaced-apart relationship about an outer surface of a rim section of the fan blade hub. The rim section is integrally connected to a central neck section through a web section. The web section has an inward concavature and extends aft of the center of gravity of the fan blades to shift the center of gravity of the hub rearwards to reduce airfoil stresses. The rim section has a lower surface merging uninterrupted into a front upper curved surface of the web section.

According to another aspect, there is provided a fan blade hub for a gas turbine engine compressor. The fan blade hub has a plurality of fan blades secured in spaced-apart relationship about a rim section of the hub. The rim section is integrally connected to a central neck section through a web section. The rim section has an inwardly projecting annular channel formed in a leading edge thereof tuned to the 2M3ND mode of the fan blade hub and providing a reduction of airfoil stresses in the leading edge.

According to a still further aspect, there is provided a fan rotor for a gas turbine engine having a central axis, comprising a fan hub mounted for rotation about said central axis, and a plurality of fan blades circumferentially distributed about a radially outer surface of an outer rim section of said fan hub, said outer rim section being connected to an inner rim section through an axially facing web section, said web section extending from the outer rim section at a location axially aft of the center of gravity of the fan blades, and a ridge formation extending radially inwardly from the outer rim axially forward of the web section.

BRIEF DESCRIPTION OF THE DRAWINGS

Reference is now made to the accompanying figures in which.

DESCRIPTION OF THE PREFERRED EMBODIMENTS

Figure 1:
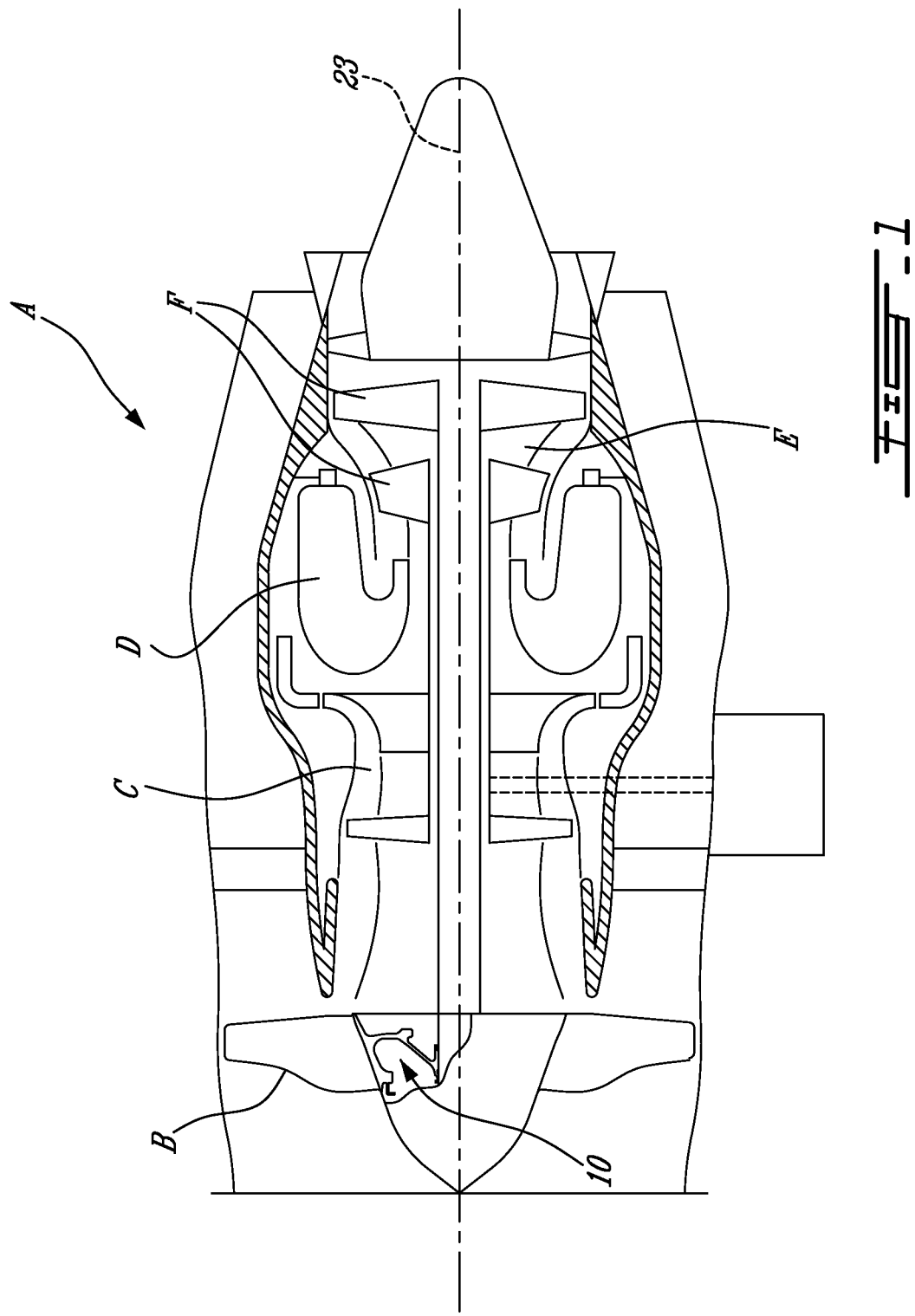
FIG. 1 is a schematic cross-sectional view of a gas turbine engine illustrating the location of the hub of the fan rotor in the compressor section of the engine.

FIG. 1 illustrates a turbo fan gas turbine engine A of a type preferably provided for use in subsonic flight, and generally comprising in serial flow communication a fan section B through which ambient air is propelled, a multi-stage compressor C for pressurizing the air, a combustor D in which the compressed air is mixed with fuel and ignited for generating an annular stream of hot combustion gases, and a turbine section E in which a series of rotating blades F are located and driven by the hot combustion gases.

Figure 2:
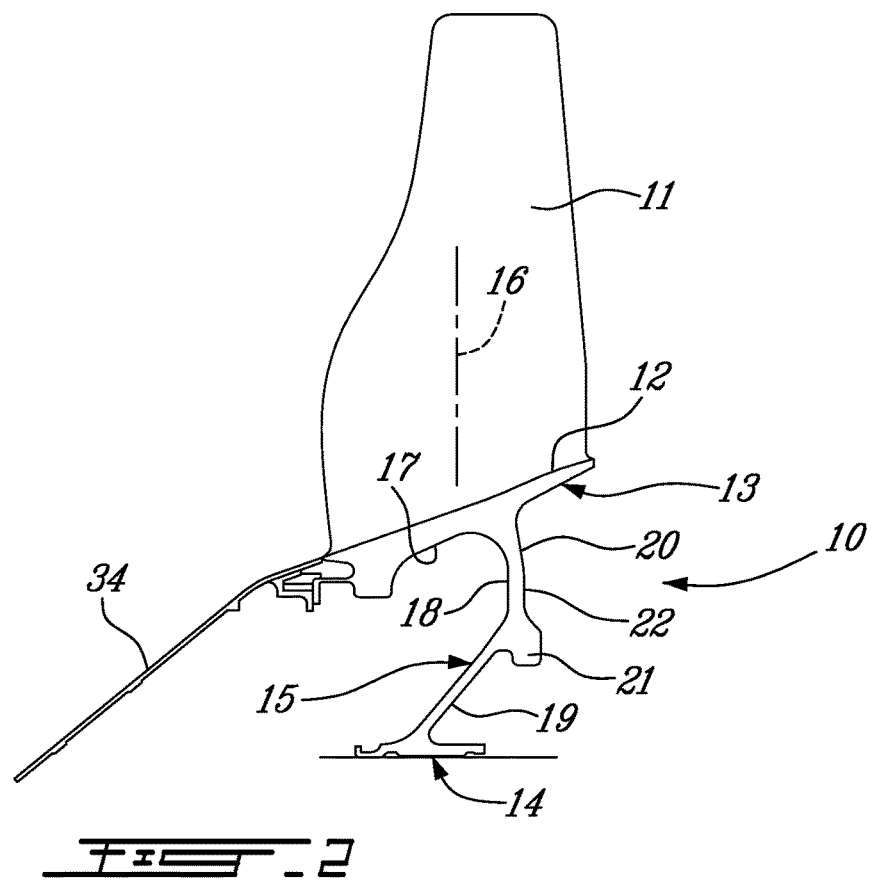
FIG. 2 is a cross-section view of the fan rotor illustrating the geometry of an embodiment of the fan hub and the axial position thereof with respect to the center of gravity of the fan blades.

As shown in FIG. 2, the fan section B comprises a fan rotor comprising a fan hub 10 carrying a circumferential array of fan blades 11. The fan rotor may be provided in the form of an integrally bladed rotor (IBR also known as blisk) or in the form of a rotor assembly comprising a disc having slots defined in a peripheral rim thereof for removably receiving the roots of fan blades.

The fan hub 10 illustrated in FIGS. 2 and 3 will now be described in more details. The fan hub 10 is a single casted or machined piece and has a plurality of fan blades 11 secured in circumferentially spaced-apart relationship about the outer surface 12 of an annular outer rim section 13 of the fan blade hub 10. The rim section 13 is integrally connected to an inner rim section 14 through an axially facing web section 15. The web section 15 has an inward concavature and extends axially aft of the center of gravity 16 of the fan blades 11 to shift the center of gravity of the hub 10 rearwards while maintaining low airfoil stresses. The rim section 13 has a radially inner surface 17 which merges uninterrupted into a front axially facing curved surface 18 of the web section 15.

The concavature of the web section 15 is provided by a radially inner web portion 19, which is angled rearwardly in a radially outer direction away from the inner rim section 14 and merging into the outer rim section 13 through a generally radial and forwardly curved radially outer web or neck portion 20 which is disposed aft of the center of gravity 16 of the airfoil blades. Both the web portion 19 and the neck portion 20 have radial and axial components. The axial components of the web portion 19 and of the neck portion 20 extend in opposed directions. The radially inner web portion 19 merges into the forwardly curved radially outer neck portion 20 in a reinforced web region formed by an annular projecting ridge formation 21 projecting from a rear surface 22 of the web section 15. The central neck section 14 is disposed parallel to the centerline 23 of the gas turbine engine, as shown in FIG. 1, and is provided with securing formations 24 for attachment to the low pressure shaft of the gas turbine engine.

Figure 3:
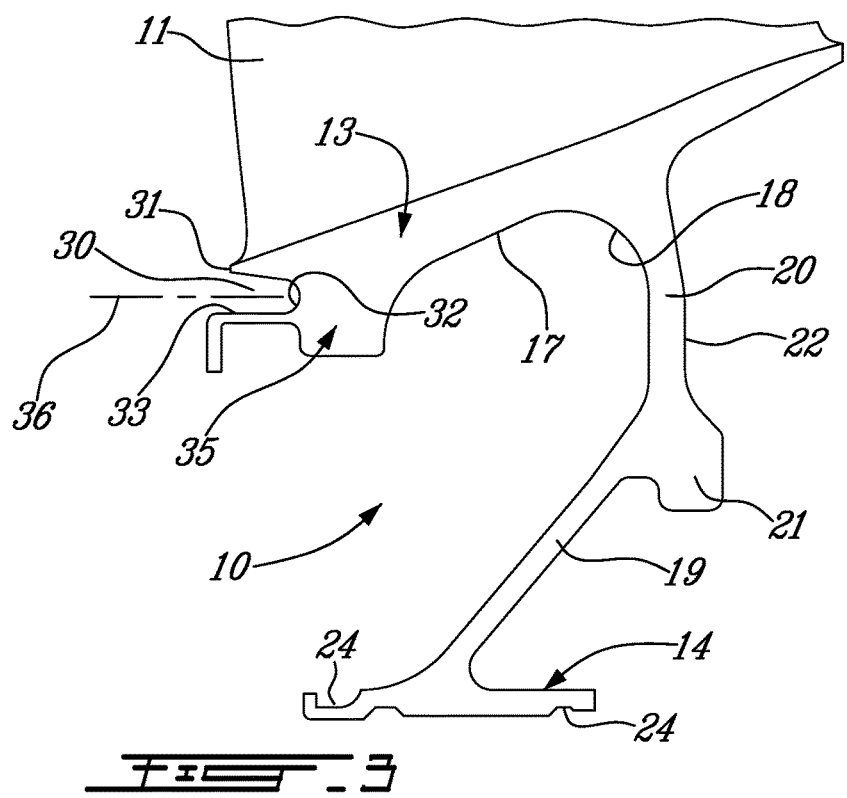
FIG. 3 is an enlarged cross-section view showing details of the fan hub shown in FIG. 2.

As better shown in FIG. 3, the outer rim section 13 is further provided with an axially inwardly projecting annular channel 30 formed in a leading edge 31 of the rim section. The annular channel 30 is essentially axial. This annular channel 30 is provided to relieve leading edge airfoil stresses. As herein shown, the annular channel 30 is of substantially U-shaped cross-section thereby defining a concavely shaped inner wall 32 and a radially inner annular flange wall or lip 33 for the attachment of an inlet cone thereto. A section 34 of the cone being illustrated in FIG. 2. The central longitudinal axis 36 of the channel 30 lies substantially parallel to the centerline 23 (see FIG. 1) of the engine.

As better seen from FIG. 3, the rim section 13 is further provided with a stiffening ridge formation 35 projecting radially inwardly from the front end portion of the rim 13 axially rearwardly of channel 30 to balance the leading edge 31 and to maintain the stresses in the leading edge low. It was demonstrated through analysis that the 2M3ND (airfoil second bending mode of vibrations) mode of vibration was very sensitive to the hub shape and by optimizing the design to that as illustrated in FIGS. 2 and 3 resulted in reduced airfoil stresses in the leading edge 31 of the hub 10.

The above described embodiment provides a hub shape wherein the center of gravity of the hub is rearward relative to conventional hub designs. It can also be appreciated that the hub front end shaped is tuned to the 2M3ND mode to maintain the leading edge stresses low.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A fan rotor for a gas turbine engine having a central axis, comprising a fan hub mounted for rotation about said central axis, and a plurality of fan blades circumferentially distributed about a radially outer surface of an outer rim section of said fan hub, said outer rim section being connected to an inner rim section through an axially facing web section, said web section extending from the outer rim section at a location axially aft of the center of gravity of the fan blades, and a ridge formation extending radially inwardly from the outer rim axially forward of the web section, and wherein the ridge formation is disposed forward of the center of gravity of the fan blades and aft of a leading edge of the fan blades, wherein the web section comprises a radially inner web portion extending away from the inner rim section in a radially outer direction and in an axially rearward direction relative to the central axis, the radially inner web portion merging into the outer rim section through a generally radial and forwardly curved radially outer web portion disposed aft of the center of gravity of the fan blades, wherein the radially inner web portion intersects the inner rim section at a location axially forward of the center of gravity of the fan blades, and wherein the radially inner web portion and the radially outer web portion intersect at a location intermediate between the inner rim section and the outer rim section.

2. The fan rotor as defined in claim 1, wherein the ridge formation extends from a front end of the outer rim.

3. The fan rotor as defined in claim 1, wherein a channel is defined in a leading edge of the outer rim section, and wherein the ridge formation extends from the outer rim section at a location disposed axially rearwardly of the channel.

4. The fan rotor as defined in claim 1, wherein the fan rotor is an integrally bladed rotor (IBR), the fan blade projecting integrally from the outer rim section; and wherein the outer rim section, the inner rim section and the axially facing web section are integral to one another.

* * * * *